United States Patent
Muldoon et al.

(10) Patent No.: US 12,000,338 B2
(45) Date of Patent: Jun. 4, 2024

(54) ELECTRIC MACHINE WITHIN A TURBINE ENGINE

(71) Applicant: Raytheon Technologies Corporation, Farmington, CT (US)

(72) Inventors: Marc J. Muldoon, Marlborough, CT (US); Russell B. Witlicki, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/967,360

(22) Filed: Oct. 17, 2022

(65) Prior Publication Data

US 2023/0212979 A1 Jul. 6, 2023

Related U.S. Application Data

(60) Provisional application No. 63/256,340, filed on Oct. 15, 2021.

(51) Int. Cl.
*F02C 7/268* (2006.01)
*F01D 25/04* (2006.01)
(Continued)

(52) U.S. Cl.
CPC ............ *F02C 6/20* (2013.01); *F01D 25/04* (2013.01); *F02C 7/06* (2013.01); *F02C 7/268* (2013.01); *F05D 2220/323* (2013.01); *F05D 2220/70* (2013.01); *F05D 2220/76* (2013.01); *F05D 2240/54* (2013.01); *F05D 2260/85* (2013.01); *F05D 2260/96* (2013.01)

(58) Field of Classification Search
CPC .... F02C 6/20; F02C 7/06; F02C 7/268; F01D 25/04; F05D 2220/323; F05D 2220/07; F05D 2220/76; F05D 2240/54; F05D 2260/85; F05D 2260/96
See application file for complete search history.

(56) References Cited

U.S. PATENT DOCUMENTS 5,076,755 A * 12/1991 Okada ............... F01D 25/164
                                                415/111
5,237,817 A    8/1993 Bornemisza
(Continued)

FOREIGN PATENT DOCUMENTS

EP        3544152 B1    10/2020
WO     2020084241 A1     4/2020

OTHER PUBLICATIONS

"American National Standard Design Manual for Enclosed Epicyclic Gear Drives", ANSI/AGMA 6023-A88, Nov. 1988.
(Continued)

*Primary Examiner* — Steven M Sutherland
(74) *Attorney, Agent, or Firm* — Getz Balich LLC

(57) ABSTRACT

An assembly is provided for a turbine engine. This turbine engine assembly includes a stationary structure, a rotating structure and an electric machine. The rotating structure is rotatably mounted to the stationary structure by a first bearing and a second bearing. The electric machine is between the first bearing and the second bearing. The electric machine includes a rotor and a stator circumscribing the rotor. The rotor is connected to the rotating structure. The stator is connected to the stationary structure.

13 Claims, 3 Drawing Sheets

(51) Int. Cl.
*F02C 6/20* (2006.01)
*F02C 7/06* (2006.01)

(56) References Cited

U.S. PATENT DOCUMENTS

| | | |
|---|---|---|
| 9,018,821 B2 | 4/2015 | Stiesdal |
| 9,917,490 B2 | 3/2018 | Lemmers |
| 10,071,811 B2 | 9/2018 | Kupiszewski |
| 10,308,366 B2 | 6/2019 | Kupiszewski |
| 10,487,839 B2 | 11/2019 | Kupiszewski |
| 10,801,410 B2 | 10/2020 | Roberge |
| 11,085,515 B2 | 8/2021 | Moniz |
| 2006/0108807 A1 | 5/2006 | Bouiller |
| 2008/0166076 A1* | 7/2008 | Stout ............... F16F 15/0237 310/90 |
| 2009/0309432 A1 | 12/2009 | Bouiller |
| 2010/0327588 A1* | 12/2010 | Macchia .............. F01D 15/10 415/232 |
| 2019/0085715 A1 | 3/2019 | Van Der Merwe |
| 2020/0063606 A1 | 2/2020 | Miller |
| 2021/0010382 A1 | 1/2021 | Davies |
| 2021/0010383 A1 | 1/2021 | Bradley |
| 2021/0010384 A1 | 1/2021 | Bradley |
| 2021/0079850 A1 | 3/2021 | Davies |

OTHER PUBLICATIONS

GB search report for GB2215229.2 dated Mar. 21, 2023.
GB Office Action for GB2215229.2 dated Jan. 8, 2024.

* cited by examiner

ELECTRIC MACHINE WITHIN A TURBINE ENGINE

This application claims priority to U.S. Patent Appln. No. 63/256,340 filed Oct. 15, 2021, which is hereby incorporated herein by reference in its entirety.

BACKGROUND OF THE DISCLOSURE

1. Technical Field

This disclosure relates generally to a turbine engine and, more particularly, to an electric machine for the turbine engine.

2. Background Information

A gas turbine engine may include an electric machine for providing mechanical power and/or electricity. The electric machine is typically connected to a gearbox outside of a core of the engine, where the gearbox is coupled with a rotor within the engine core via a tower shaft. Some efforts have been made to arrange the electric machine within the engine core to reduce overall size of the gas turbine engine. There is a need in the art, however, for structures and architectures which facilitate arrangement of the electric machine within the engine core.

SUMMARY OF THE DISCLOSURE

According to an aspect of the present disclosure, an assembly is provided for a turbine engine. This turbine engine assembly includes a stationary structure, a rotating structure and an electric machine. The rotating structure is rotatably mounted to the stationary structure by a first bearing and a second bearing. The electric machine is between the first bearing and the second bearing. The electric machine includes a rotor and a stator circumscribing the rotor. The rotor is connected to the rotating structure. The stator is connected to the stationary structure.

According to another aspect of the present disclosure, another assembly is provided for a turbine engine. This turbine engine assembly includes a rotating structure, a stationary structure and an electric machine. The rotating structure is rotatably supported by a first bearing and a second bearing. The stationary structure includes a first leg and a second leg. The first leg supports the first bearing independent of the second leg. The second leg supports the second bearing independent of the first leg. The electric machine is between the first bearing and the second bearing. The electric machine includes a rotor and a stator. The rotor is connected to the rotating structure. The stator is connected to the stationary structure.

According to still another aspect of the present disclosure, another assembly is provided for a turbine engine. This turbine engine assembly includes a rotating structure, a stationary structure and an electric machine. The rotating structure is rotatably supported by a first bearing. The stationary structure includes a first leg and a second leg. The first leg supports the first bearing independent of the second leg. The electric machine is axially next to the first bearing. The electric machine includes a rotor and a stator. The rotor is connected to the rotating structure. The second leg supports the stator independent of the first leg. The support structure circumscribes the electric machine.

The rotating structure may be rotatably supported by a second bearing. The second leg may support the second bearing independent of the first leg. The electric machine may be located axially between the first bearing and the second bearing.

The rotor may be arranged within a bore of the stator.

The turbine engine assembly may also include a first damper and/or a second damper. The first damper may be arranged between the first bearing and the first leg. The second damper may be arranged between the second bearing and the second leg.

The electric machine may be configured as a motor during at least one mode of operation.

The electric machine may be configured as a generator during at least one mode of operation.

The turbine engine assembly may also include a compressor section, a combustor section and a turbine section arranged along a rotational axis of the turbine engine. The turbine engine assembly may still also include a case housing the compressor section, the combustor section, the turbine section and the electric machine.

The turbine engine assembly may also include a compressor section, a combustor section, a turbine section and a flowpath extending sequentially through the compressor section, the combustor section and the turbine section. The electric machine may be radially inboard of the flowpath.

The stationary structure may include a base support, a first leg and a second leg. The first leg may be connected to and may project out from the base support. The first leg may be configured to support the first bearing. The second leg may be connected to and may project out from the base support. The second leg may be configured to support the second bearing.

The first leg may be connected to the base support independent of the second leg. In addition or alternatively, the second leg may be connected to the base support independent of the first leg.

The second leg may also be configured to support the stator.

The first leg may be structurally independent of the stator.

The electric machine may also include a machine case connected to and supported by the second leg. The stator and the rotor may be at least partially housed within the machine case.

The turbine engine assembly may also include a first damper and/or a second damper. The first damper may provide a first damped connection between the first bearing and the first leg. The second damper may provide a second damped connection between the second bearing and the second leg.

The turbine engine assembly may also include a first damper and/or a second damper. The first damper may be arranged between the first bearing and the stationary structure. The second damper may be arranged between the second bearing and the stationary structure.

The stationary structure may circumscribe the electric machine.

The rotating structure may include a compressor rotor, a turbine rotor and a shaft coupling the turbine rotor to the compressor rotor.

The compressor rotor and the turbine rotor may be axially disposed to a common side of the electric machine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
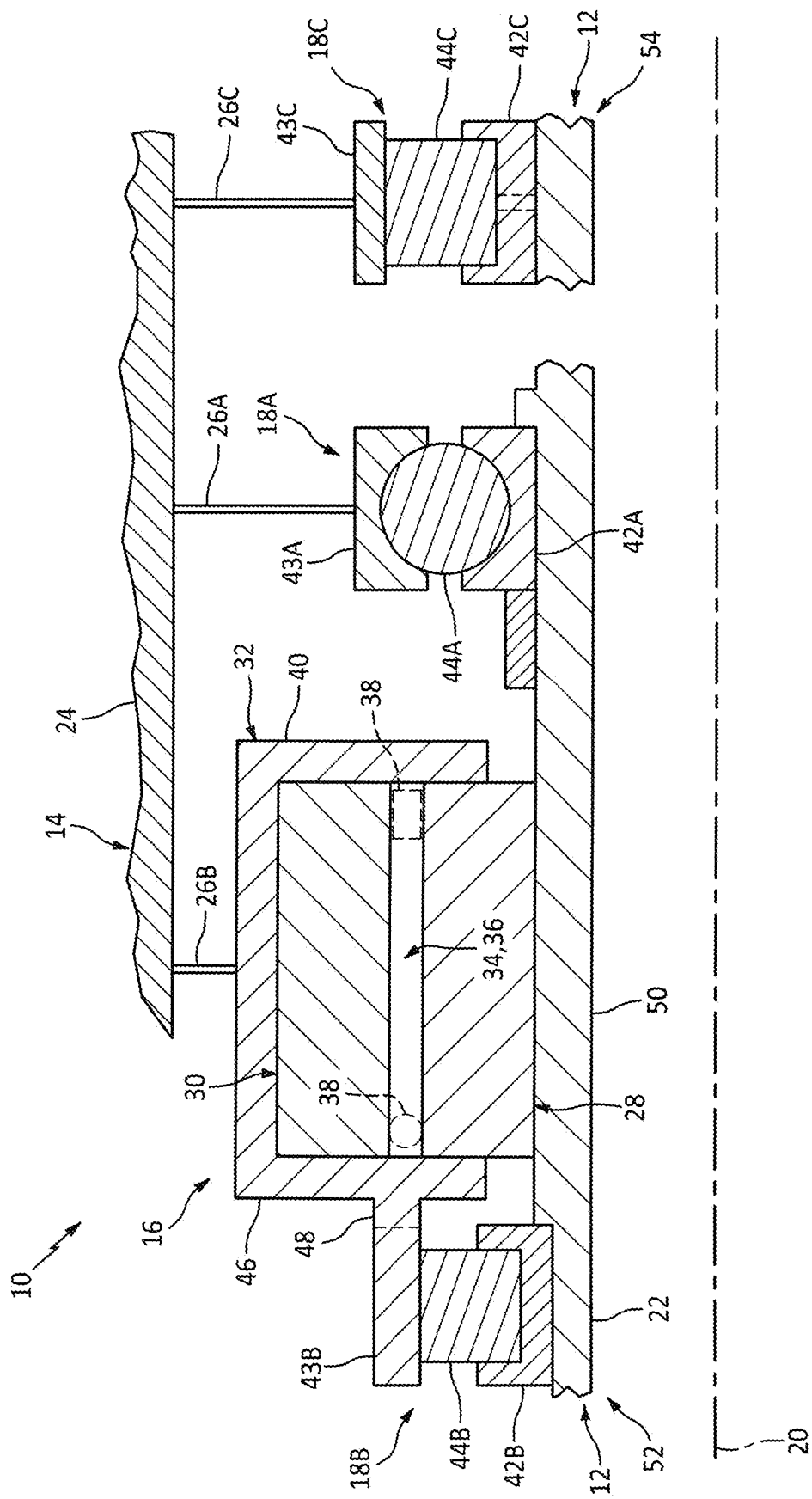
FIG. 1 is partial side sectional illustration of an assembly for a turbine engine.

FIG. 1 illustrates an assembly 10 for a turbine engine. This turbine engine assembly 10 includes a rotating structure 12, a stationary structure 14 and an electric machine 16. The turbine engine assembly 10 also includes one or more rotating structure bearings 18A-C (generally referred to as "18") that rotatably mount the rotating structure 12 to the stationary structure 14.

The rotating structure 12 extends axially along and circumferentially around a rotational axis 20, which rotational axis 20 may be an axial centerline of the turbine engine assembly 10. The rotating structure 12 is rotatable about the rotational axis 20. The rotating structure 12 may be configured as or otherwise include any rotatable component or assembly of rotatable components within the turbine engine. The rotating structure 12 of FIG. 1, for example, is configured as or otherwise include a turbine engine shaft 22. In some embodiments, the rotating structure 12 may also include one or more additional elements such as, but not limited to, sleeves, spacers, rotors, etc. Furthermore, while the turbine engine shaft 22 is generally depicted as a single monolithic body, the turbine engine shaft 22 may alternatively include a plurality of interconnected shafts/shaft segments.

The stationary structure 14 may be configured as or otherwise include any stationary (e.g., static, non-rotating) component or assembly of stationary components within the turbine engine. The stationary structure 14, for example, may include a turbine engine case and one or more internal support structures within and connected to the turbine engine case.

The stationary structure 14 of FIG. 1 includes a base support 24 and one or more support legs 26A-C (generally referred to as "26"). The base support 24 may be configured as or otherwise include the turbine engine case and/or a support frame (or frames) within and connected to the turbine engine case.

Each of the support legs 26 may be configured as or otherwise include a support strut and/or a mounting structure. Each of the support legs 26 of FIG. 1 is located radially inboard of the base support 24. Each of these support legs 26 is connected to the base support 24. Each of the support legs 26 projects out (e.g., in a radial inward direction towards the rotational axis 20) from the base support 24 to or towards a respective component of the turbine engine assembly 10. The leg 26A of FIG. 1, for example, projects towards and is configured to support the bearing 18A. The leg 26B projects towards and is configured to support the electric machine 16 and/or the bearing 18B. The leg 26C projects towards and is configured to support the bearing 18C.

Each of the support legs 26 may be configured as a discrete structural member of the stationary structure 14. For example, the leg 26A may be connected to the base support 24 independent of (e.g., discrete from, separate from) the leg 26B and/or the leg 26C. A first load path may thereby extend from the bearing 18A, through the leg 26A, to the base support 24 independent of the other support legs 26B and/or 26C. The leg 26B may be connected to the base support 24 independent of the leg 26A and/or the leg 26C. A second load path may thereby extend from the electric machine 16 and/or the bearing 18B, through the leg 26B, to the base support 24 independent of the other support legs 26A and/or 26C. The leg 26C may be connected to the base support 24 independent of the leg 26A and the leg 26B. A third load path may thereby extend from the bearing 18C, through the leg 26C, to the base support 24 independent of the other support legs 26A and/or 26B. Of course, in other embodiments, one or more of these support legs 26 may be interconnected and/or otherwise structurally dependent upon one another.

The electric machine 16 is configurable as an electric motor and/or an electric generator. For example, during a motor mode of operation, the electric machine 16 may operate as the electric motor to convert electricity (e.g., received from a battery and/or another electricity source) into mechanical power; e.g., torque. This mechanical power may be utilized for various purposes within the turbine engine such as, for example, rotating the rotating structure 12 during turbine engine startup. During a generator mode of operation, the electric machine 16 may operate as the electric generator to convert mechanical power (e.g., received through the rotating structure 12) into electricity. This electricity may be utilized for various purposes within the turbine engine such as, for example, electrically powering one or more electric components of the turbine engine and/or charging the battery. The electricity may also or alternatively be utilized for various purposes outside of the turbine engine such as, for example, electrically powering one or more electrical components in an aircraft.

The electric machine 16 includes an (e.g., annular) electric machine rotor 28 and an (e.g., annular) electric machine stator 30. The electric machine 16 also includes an (e.g., annular) electric machine case 32 that at least partially or completely houses the machine rotor 28 and/or the machine stator 30.

The machine rotor 28 is at least partially disposed within an internal cavity 34 of the machine case 32. The machine rotor 28 is connected (e.g., fixedly mounted) to the rotating structure 12 and its turbine engine shaft 22. The machine rotor 28 is configured to rotate with the rotating structure 12 and its turbine engine shaft 22 about the rotational axis 20.

The machine stator 30 is (e.g., completely) disposed within the internal cavity 34 of the machine case 32. The machine stator 30 is connected (e.g., fixedly mounted) to the stationary structure 14. The machine stator 30 of FIG. 1, for example, is fixedly connected to the machine case 32, and the machine case 32 is fixedly connected to the leg 26B; e.g., independent of the other support legs 26A and/or 26C.

The machine stator 30 of FIG. 1 axially overlaps the machine rotor 28 along the rotational axis 20, and extends circumferentially about (e.g., completely around, circumscribes) the machine rotor 28. The machine rotor 28 of FIG. 1 is thereby disposed within a bore of the machine stator 30. However, the machine rotor 28 may be radially spaced from the machine stator 30 by an annular radial clearance gap 36; e.g., an air gap. The machine rotor 28 may thereby be located in close proximity to, but may not contact, the machine stator 30.

The electric machine 16 may also include one or more internal electric machine bearings 38 (schematically shown); e.g., rolling element bearings, etc. These bearings 38 are arranged within the internal cavity 34 of the machine case 32. The bearings 38 are disposed radially between and are engaged with the machine rotor 28 and a stationary structure of the electric machine 16; e.g., the machine stator 30 of FIG. 1. The bearings 38 may thereby rotatably support the machine rotor 28 within the electric machine 16 as well as maintain the clearance gap 36 between the machine rotor 28 and the machine stator 30. However, in other embodiments, the bearings 38 may be omitted where, for example, the bearing 18A and the bearing 18B provide sufficient support for the electric machine 16 and maintain the clearance gap 36.

Each of the bearings 18 may be arranged discrete from the electric machine 16. Each of the bearings 18 of FIG. 1, for example, is arranged outside of and/or spaced from the electric machine 16 and its machine case 32.

The bearing 18A may be arranged proximate (e.g., close to) the electric machine 16. The bearing 18A of FIG. 1, for example, is located axially next to (e.g., axially neighbors) and is disposed on a first side 40 of the electric machine 16. The bearing 18A is spaced from the machine case 32 by an axial gap; e.g., an air gap.

The bearing 18A may be configured as a rolling element bearing. The bearing 18A of FIG. 1, for example, includes a bearing inner race 42A, a bearing outer race 43A and a plurality of bearing rolling elements 44A. The inner race 42A is connected (e.g., fixedly mounted) to the rotating structure 12 and its turbine engine shaft 22. The outer race 43A is connected (e.g., fixedly mounted) to the stationary structure 14. The outer race 43A of FIG. 1, for example, is connected to the leg 26A; e.g., independent of the other support legs 26B and/or 26C. The rolling elements 44A are arranged circumferentially about the rotational axis 20 in an array, and disposed radially between and engaged with the inner race 42A and the outer race 43A. With this arrangement, the bearing 18A is configured to rotatably mount the rotating structure 12 to the leg 26A.

The bearing 18B may be arranged proximate (e.g., close to) the electric machine 16. The bearing 18B of FIG. 1, for example, is located axially next to (e.g., axially neighbors) and is disposed on a second side 46 of the electric machine 16. The bearing 18B may be spaced from the machine case 32 by an axial gap; e.g., an air gap.

The bearing 18B may be configured as a rolling element bearing. The bearing 18B of FIG. 1, for example, includes a bearing inner race 42B, a bearing outer race 43B and a plurality of bearing rolling elements 44B. The inner race 42B is connected (e.g., fixedly mounted) to the rotating structure 12 and its turbine engine shaft 22. The outer race 43B is connected (e.g., fixedly mounted) to the stationary structure 14. The outer race 43B of FIG. 1, for example, is connected to a bearing support 48 (e.g., a mount, a flange, etc.), where bearing support 48 projects out from and is connected to the machine case 32, and where the machine case 32 is connected to the leg 26B as described above. Here, the bearing support 48 is configured as an extension of the outer race 43B and/or a bridge between the elements 32 and 43B; however, in other embodiments, the bearing support 48 and the outer race 43B may be discrete elements. The leg 26B may structurally support the bearing 18B through the machine case 32. Of course, in other embodiments, the leg 26B may structurally support the machine case 32 through the bearing support 48 or otherwise. The rolling elements 44B of FIG. 1 are arranged circumferentially about the rotational axis 20 in an array, and disposed radially between and engaged with the inner race 42B and the outer race 43B. With this arrangement, the bearing 18B is configured to rotatably mount the rotating structure 12 to the leg 26B.

With the foregoing arrangement, the electric machine 16 is disposed axially between the bearing 18A and the bearing 18B. The bearing 18A and the bearing 18B may thereby provide balanced support for a segment 50 of the rotating structure 12 aligned with the electric machine 16 and, thus, the machine rotor 28 connected to that rotating structure segment 50. The bearing 18A and the bearing 18B may also reduce movement (e.g., shifting) between the rotating structure 12 and the stationary structure 14 at the electric machine 16, particularly as compared to an assembly where the bearing 18B is omitted and the rotating structure segment 50 is cantilevered for example. Reducing movement between the rotating structure 12 and the stationary structure 14 may reduce stresses on the electric machine 16 and/or the rotating structure segment 50, and may also or alternatively facilitate maintenance of the clearance gap 36.

The bearing 18C may be arranged distal (e.g., away) from the electric machine 16. The bearing 18C of FIG. 1, for example, is located axially on the first side 40 of the electric machine 16 at or towards another end of the rotating structure 12. For example, where the electric machine 16 is located towards a first (e.g., forward or aft) end 52 of the rotating structure 12, the bearing 18C may be located towards or at an opposite second (e.g., aft or forward) end 54 of the rotating structure 12.

The bearing 18C may be configured as a rolling element bearing. The bearing 18C of FIG. 1, for example, includes a bearing inner race 42C, a bearing outer race 43C and a plurality of bearing rolling elements 44C. The inner race 42C is connected (e.g., fixedly mounted) to the rotating structure 12 and its turbine engine shaft 22. The outer race 43C is connected (e.g., fixedly mounted) to the stationary structure 14. The outer race 43C of FIG. 1, for example, is connected to the leg 26C; e.g., independent of the other support legs 26A and/or 26B. The rolling elements 44C are arranged circumferentially about the rotational axis 20 in an array, and disposed radially between and engaged with the inner race 42C and the outer race 43C. With this arrangement, the bearing 18C is configured to rotatably mount the rotating structure 12 to the leg 26C.

In some embodiments, the leg 26A is configured structurally independent of the electric machine 16 and its machine stator 30. The leg 26A of FIG. 1, for example, is not structurally tied/connected to the electric machine 16 and its machine stator 30. Of course, in other embodiments, the leg 26A may be configured to further support the electric machine 16 and its machine stator 30.

Figure 2:
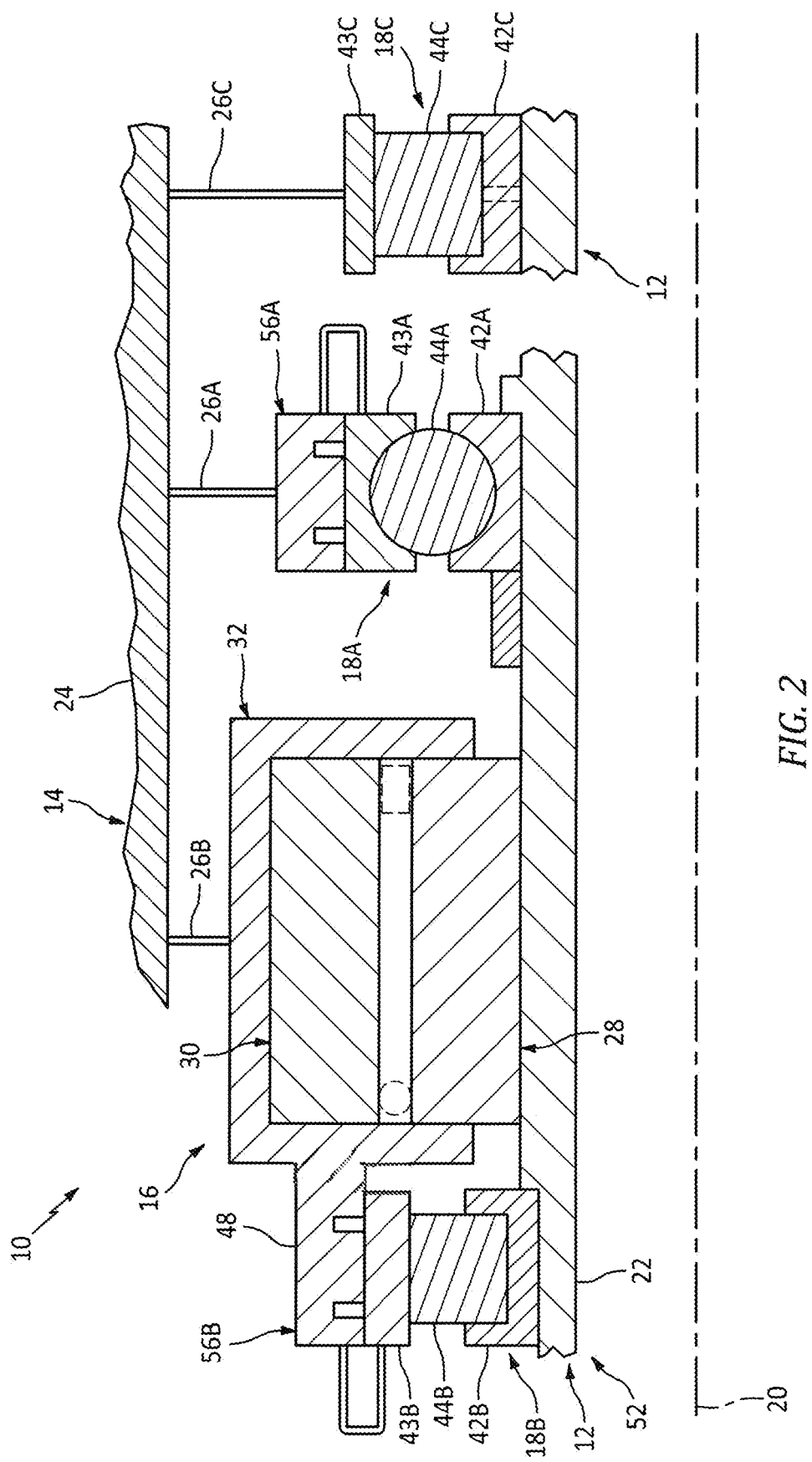
FIG. 2 is a partial side sectional illustration of the turbine engine assembly further configured with one or more dampers.

In some embodiments, referring to FIG. 2, the turbine engine assembly 10 may also include one or more fluid dampers 56A and 56B (generally referred to as "56"). The damper 56A is arranged between and engaged with the bearing 18A and the stationary structure 14. The damper 56A of FIG. 2, for example, is configured to provide a damped connection between the outer race 43A and the leg 26A. This damper 56A is configured to facilitate slight controlled (e.g., damped) movement (e.g., axial and/or circumferential shifting) between (1) the bearing 18A and its outer race 43A and (2) the stationary structure 14 and its leg 26A. Similarly, the damper 56B is arranged between the bearing 18B and the stationary structure 14. The damper 56B of FIG. 2, for example, is configured to provide a damped connection between the outer race 43B and the leg 26B and, more particularly, between the outer race 43B and the machine case 32. In this embodiment, the damper 56B may be integrated with (or connected to) the bearing support 48. The damper 56B is configured to facilitate slight controlled (e.g., damped) movement (e.g., axial and/or circumferential shifting) between (1) the bearing 18B and its outer race 43B and (2) the stationary structure 14 and its leg 26B.

Figure 3:
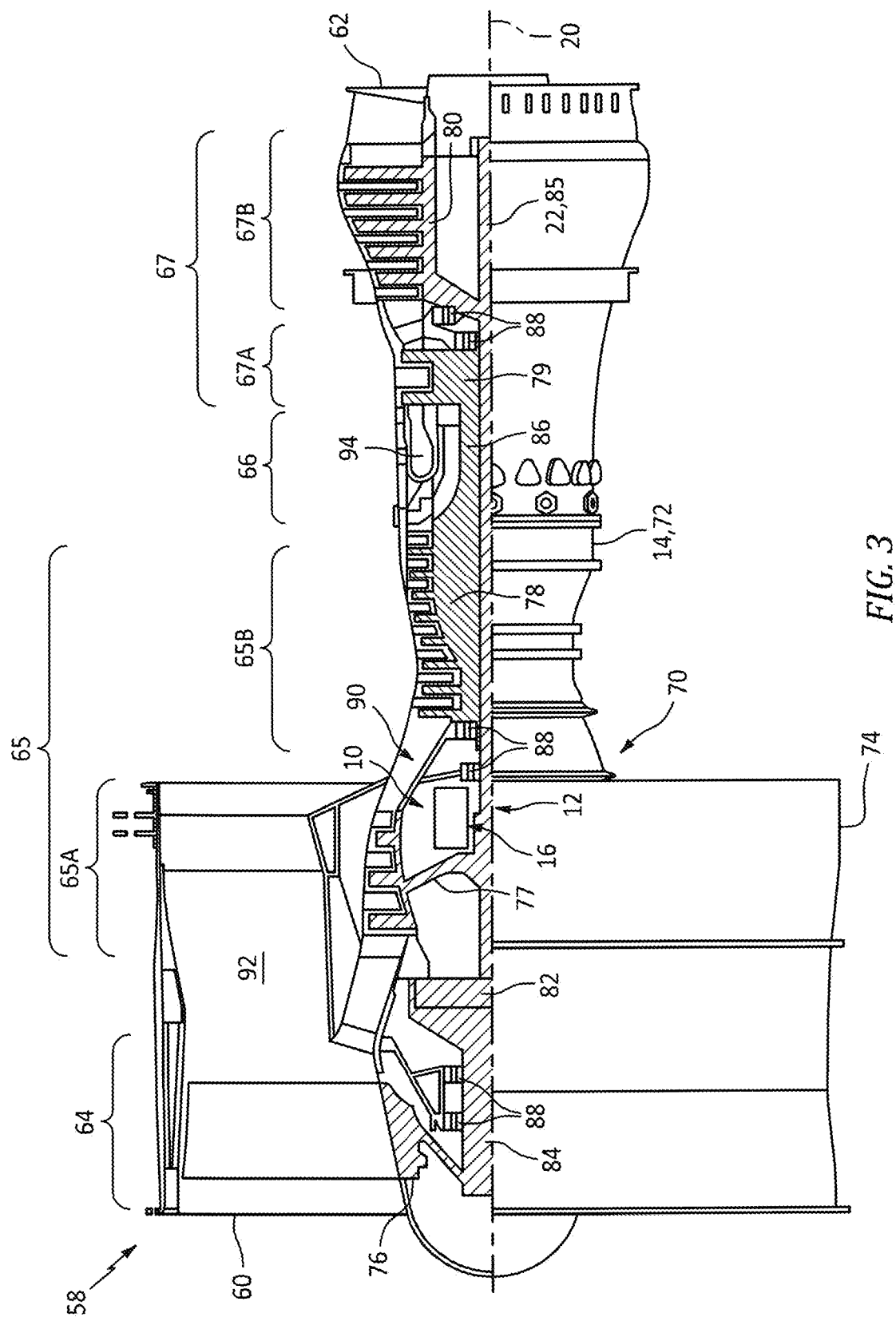
FIG. 3 is a side cutaway illustration of a geared turbofan gas turbine engine.

FIG. 3 illustrates an example of the turbine engine with which the turbine engine assembly 10 may be configured. This turbine engine is configured as a geared, turbofan gas turbine engine 58. This turbine engine 58 extends along the rotational axis 20 between an upstream airflow inlet 60 and a downstream airflow exhaust 62. The turbine engine 58 includes a fan section 64, a compressor section 65, a combustor section 66 and a turbine section 67. The compressor section 65 includes a low pressure compressor (LPC) section 65A and a high pressure compressor (HPC) section 65B. The turbine section 67 includes a high pressure turbine (HPT) section 67A and a low pressure turbine (LPT) section 67B.

The engine sections 64-67B are arranged sequentially along the rotational axis 20 within an engine housing 70. This engine housing 70 includes an inner case 72 (e.g., a core case) and an outer case 74 (e.g., a fan case). The inner case 72 may house one or more of the engine sections 65A-67B (e.g., an engine core) as well as the electric machine 16. The outer case 74 may house at least the fan section 64.

Each of the engine sections 64, 65A, 65B, 67A and 67B includes a respective rotor 76-80. Each of these rotors 76-80 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 76 is connected to a gear train 82, for example, through a fan shaft 84. The gear train 82 and the LPC rotor 77 are connected to and driven by the LPT rotor 80 through a low speed shaft 85. The HPC rotor 78 is connected to and driven by the HPT rotor 79 through a high speed shaft 86. The shafts 84-86 are rotatably supported by a plurality of bearings 88; e.g., rolling element bearings. Each of these bearings 88 is connected to the engine housing 70 by, for example, an annular support strut.

During operation, air enters the turbine engine through the airflow inlet 60. This air is directed through the fan section 64 and into a core flowpath 90 and a bypass flowpath 92. The core flowpath 90 extends sequentially through the engine sections 65A-67B. The air within the core flowpath 90 may be referred to as "core air". The bypass flowpath 92 extends through a bypass duct, which bypasses the engine core. The air within the bypass flowpath 92 may be referred to as "bypass air".

The core air is compressed by the LPC rotor 77 and the HPC rotor 78 and directed into a combustion chamber 94 of a combustor in the combustor section 66. Fuel is injected into the combustion chamber 94 and mixed with the compressed core air to provide a fuel-air mixture. This fuel air mixture is ignited and combustion products thereof flow through and sequentially cause the HPT rotor 79 and the LPT rotor 80 to rotate. The rotation of the HPT rotor 79 and the LPT rotor 80 respectively drive rotation of the HPC rotor 78 and the LPC rotor 77 and, thus, compression of the air received from a core airflow inlet. The rotation of the LPT rotor 80 also drives rotation of the fan rotor 76, which propels bypass air through and out of the bypass flowpath 92. The propulsion of the bypass air may account for a majority of thrust generated by the turbine engine 58, e.g., more than seventy-five percent (75%) of engine thrust. The turbine engine of the present disclosure, however, is not limited to the foregoing exemplary thrust ratio.

The turbine engine assembly 10 may be configured at various different locations within the turbine engine 58. For example, the turbine engine assembly 10 and its electric machine 16 may be housed within the engine housing 70 and, more particularly, the inner case 72. The stationary structure 14, for example, may be or otherwise include the inner case 72. The electric machine 16 may also be disposed radially inboard of the core flowpath 90, where the core flowpath 90 axially overlaps and extends circumferentially about (e.g., completely around, circumscribes) the electric machine 16. For example, the electric machine 16 may be arranged with/axially aligned with the compressor section 65, where the turbine engine shaft 22 may be one of the shafts 84-86 (e.g., 85) and the bearings 18 (see FIG. 1) may be a respective set of the bearings 88 supporting the respective shaft. The present disclosure, however, is not limited to such an exemplary arrangement. For example, in other embodiments, the turbine engine assembly 10 and its electric machine 16 may also or alternatively be arranged with/aligned with another one or more sections 64, 66 and/or 67 of the turbine engine 58.

The turbine engine assembly 10 may be included in various turbine engines other than the one described above. The turbine engine assembly 10, for example, may be included in a geared turbine engine where a gear train connects one or more shafts to one or more rotors in a fan section, a compressor section and/or any other engine section. Alternatively, the turbine engine assembly 10 may be included in a direct drive turbine engine configured without a gear train. The turbine engine assembly 10 may be included in a turbine engine configured with a single spool, with two spools (e.g., see FIG. 3), or with more than two spools. The turbine engine may be configured as a turbofan engine, a turbojet engine, a turboprop engine, a turboshaft engine, a propfan engine, a pusher fan engine or any other type of turbine engine. The turbine engine may alternative be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
   a stationary structure including a base support, a first leg and a second leg;
   a rotating structure rotatably mounted to the stationary structure by a first bearing and a second bearing; and
   an electric machine between the first bearing and the second bearing, the electric machine including a machine case, a rotor and a stator circumscribing the rotor, the rotor connected to the rotating structure, the stator connected to the stationary structure, and the stator and the rotor housed within the machine case;
   the first leg connected to and projecting out from the base support, and the first leg configured to support the first bearing; and the second leg connected to and projecting out from the base support, and the second leg configured to support the second bearing through the machine case.

2. The assembly of claim 1, wherein the electric machine is configured as a motor during at least one mode of operation.

3. The assembly of claim 1, wherein the electric machine is configured as a generator during at least one mode of operation.

4. The assembly of claim 1, further comprising:
a compressor section, a combustor section and a turbine section arranged along a rotational axis of the turbine engine; and
an engine case housing the compressor section, the combustor section, the turbine section and the electric machine.

5. The assembly of claim 1, further comprising:
a compressor section, a combustor section, a turbine section and a flowpath extending sequentially through the compressor section, the combustor section and the turbine section;
the electric machine radially inboard of the flowpath.

6. The assembly of claim 1, wherein at least one of
the first leg is connected to the base support independent of the second leg; or
the second leg is connected to the base support independent of the first leg.

7. The assembly of claim 1, wherein the second leg is further configured to support the stator through the machine case.

8. The assembly of claim 1, wherein the first leg is structurally independent of the stator.

9. The assembly of claim 1, wherein
the machine case is connected to and supported by the second leg; and
the second bearing is connected to the machine case independent of the second leg.

10. The assembly of claim 1, further comprising at least one of:
a first damper providing a first damped connection between the first bearing and the first leg; or
a second damper providing a second damped connection between the second bearing and the second leg.

11. The assembly of claim 1, further comprising:
a first damper arranged between the first bearing and the stationary structure; and
a second damper arranged between the second bearing and the stationary structure.

12. The assembly of claim 1, wherein the stationary structure circumscribes the electric machine.

13. The assembly of claim 1, wherein the rotating structure comprises a compressor rotor, a turbine rotor and a shaft coupling the turbine rotor to the compressor rotor.

* * * * *